(12) United States Patent
Wu

(10) Patent No.: US 8,296,616 B2
(45) Date of Patent: Oct. 23, 2012

(54) METHOD OF DISTINGUISHING HYBRID AUTOMATIC REPEAT REQUEST PROCESSES AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 381 days.

(21) Appl. No.: 12/649,356

(22) Filed: Dec. 30, 2009

(65) Prior Publication Data

US 2010/0169732 A1 Jul. 1, 2010

Related U.S. Application Data

(60) Provisional application No. 61/141,247, filed on Dec. 30, 2008.

(51) Int. Cl.
*G08C 25/02* (2006.01)
(52) U.S. Cl. ....................................................... 714/748
(58) Field of Classification Search .................. 714/748
See application file for complete search history.

(56) References Cited

U.S. PATENT DOCUMENTS

| 7,366,477 | B2 * | 4/2008 | Sebire et al. ............ 455/69 |
| 2009/0257408 | A1 | 10/2009 | Zhang |
| 2009/0282310 | A1 * | 11/2009 | Seok et al. .............. 714/748 |
| 2009/0300456 | A1 * | 12/2009 | Pelletier et al. ........... 714/749 |
| 2009/0323564 | A1 * | 12/2009 | Chiu ...................... 370/280 |
| 2010/0017671 | A1 * | 1/2010 | Cai et al. ................. 714/748 |
| 2010/0050039 | A1 * | 2/2010 | Zhang et al. ............. 714/749 |
| 2011/0141952 | A1 * | 6/2011 | Wang et al. .............. 370/294 |

OTHER PUBLICATIONS

3GPP TS 36.321 V8.3.0 3rd Generation Partnership Project; Technical Specification Group Radio Access Network; Evolved Universal Terrestrial Radio Access (E-UTRA) Medium Access Control (MAC) protocol specification (Release 8), Sep. 2008.
3GPP R1-084549 TTI bundling, Nov. 2008.
3rd Generation Partnership Project; Technical Specification Group Radio Access Network; Medium Access Control (MAC) protocol specification (Release 8), 3GPP TS 25.321 V8.1.0 (Mar. 2008), pp. 112-131, XP002597612.
Research in Motion, Samsung: "Linking HARQ process ID with the SPS resource", 3GPP TSG-RAN2#64 meeting, R2-086623, Nov. 10-14, 2008, pp. 1-3, XP050321519, Prague, The Czech Republic.
Research in Motion, Samsung: "Linking HARQ process ID with the SPS resource", 3GPP TSG-RAN2#64 meeting, R2-087074, Nov. 10-14, 2008, pp. 1-3, XP050321004, Prague, The Czech Republic.
3rd Generation Partnership Project; Technical Specification Group Radio Access Network; Evolved Universal Terrestrial Radio Access (E-UTRA) Medium Access Control (MAC) protocol specification (Release 8), 3GPP TS 36.321 V8.4.0 (Dec. 2008), pp. 16-21, XP002597614.
Nokia, Nokia Siemens Networks: "UL HARQ Timing of TDD", 3GPP TSG RAN WG1 Meeting #52, R1-080957, Feb. 11-15, 2008, XP050109429, Sorrento, Italy.
HTC Corporation: "CR to HARQ process and subframe association in TTI bundling", 3GPP TSG-RAN2 Meeting #64bis, R2-090143, Jan. 12-16, 2009, XP050322178, Ljubljana, Slovenia.

(Continued)

*Primary Examiner* — Yolanda L Wilson
(74) *Attorney, Agent, or Firm* — Winston Hsu; Scott Margo

(57) ABSTRACT

A method of distinguishing hybrid automatic repeat request, hereinafter called HARQ, processes for a mobile device of a wireless communication system includes assigning a plurality of HARQ reference numbers corresponding to a plurality of uplink HARQ processes respectively, for identifying each of the plurality of uplink HARQ processes.

22 Claims, 11 Drawing Sheets

OTHER PUBLICATIONS

ZTE Corporation: "The start time for TTI Bundling", 3GPP TSG-RAN WG2#63-bis, Tdoc R2-085564, Sep. 29-Oct. 3, 2008, pp. 1/4-4/4, XP050320371, Prague Czech (including ZTE : "Clarification on the start time for TTI Bundling", 3GPP TSG-RAN WG2#63, Tdoc R2-xxxxxx, Aug. 18-22, 2008, KR—Jeju Island).

"3rd Generation Partnership Project; Technical Specification Group Radio Access Network; Evolved Universal Terrestrial Radio Access (E-UTRA); Physical layer procedures (Release 8)", 3GPP TS 36.213 V8.5.0(Dec. 2008), pp. 53-65, XP002608716.

Sunplus Mmobile Inc.: "Clarification on HARQ process for dynamic TTI bundling", 3GPP TSG-RAN WG2 Meeting #64bis, R2-090460, Jan. 12-16, 2009, pp. 1-3, XP050322401, Ljubljana, Slovenia.

Sunplus Mmobile Inc., Qualcomm : "Clarification on HARQ process for TTI bundling", 3GPP TSG-RAN WG2 Meeting #64bis, R2-09xxxx, Jan. 12-16, 2009, pp. 1-3, XP050322553, Ljubljana, Slovenia.

Nokia Corporation, Nokia Siemens Networks: "Bundling Issues", 3GPP TSG-RAN WG2 Meeting #62bis, R2-083107, Jun. 30-Jul. 4, 2008, XP050140545, Warsaw, Poland.

TSG RAN WG2: "MAC handling for measurement gaps", 3GPP TSG RAN WG1 Meeting #54bis, R1-083473, Sep. 29-Oct. 3, 2008, XP050316844, Prague, Czech Rep. (3GPP TSG-RAN WG2 Meeting #63, R2-084900, Aug. 18-22, 2008, Jeju Island, Korea).

ASUSTek: "CR 0107 to 36.321 Interactions between measurement gap and Msg3 transmission", 3GPP TSG-RAN WG2 #64, R2-087019, Nov. 10-14, 2008, pp. 1-3, XP050320941, Prague, Czech Republic.

Alcatel-Lucent, ASUSTek, CATT, Ericsson, Fujitsu, Huawei, LG Electronics Inc., Nokia Corporation, Nokia Siemens Networks, NTT DOCOMO Inc., Panasonic, Qualcomm Europe, Sunplus Mmobile Inc. : "UL HARQ and Measurement Gaps", 3GPP TSG-RAN2 Meeting #64, R2-086079, Oct. 10-14, 2008, XP050321143, Prague, Czech Republic.

Nokia Corporation, Nokia Siemens Networks, Samsung: "Message 3 Definition", 3GPP TSG-RAN2 Meeting #64, R2-086077, Oct. 10-14, 2008, XP050320960, Prague, Czech Republic.

* cited by examiner

| SFN | 0 | 0 | 0 | 0 | 0 | 0 | 0 | 0 | 0 | 0 | 1 | 1 | 1 | 1 | 1 | 1 | 1 | 1 | 1 | 1 | 2 | 2 | 2 | 2 | 2 | 2 | 2 | 2 |
|---|---|---|---|---|---|---|---|---|---|---|---|---|---|---|---|---|---|---|---|---|---|---|---|---|---|---|---|---|
| Subframe Number (SN) | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 |
| HARQ RTT | ∞ | ∞ | ∞ | ∞ | ∞ | ∞ | ∞ | ∞ | ∞ | ∞ | ∞ | ∞ | ∞ | ∞ | ∞ | ∞ | ∞ | ∞ | ∞ | ∞ | ∞ | ∞ | ∞ | ∞ | ∞ | ∞ | ∞ | ∞ |
| HARQ reference number (HRN) | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 |

FIG. 5

| SFN | 0 | 0 | 0 | 0 | 0 | 0 | 0 | 0 | 0 | 0 | 1 | 1 | 1 | 1 | 1 | 1 | 1 | 1 | 1 | 1 | 2 | 2 | 2 | 2 | 2 | 2 | 2 | 2 | 2 | 2 |
|---|---|---|---|---|---|---|---|---|---|---|---|---|---|---|---|---|---|---|---|---|---|---|---|---|---|---|---|---|---|---|
| Subframe number (SN) | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| HARQRTT | 16 | 16 | 16 | 16 | 16 | 16 | 16 | 16 | 16 | 16 | 16 | 16 | 16 | 16 | 16 | 16 | 16 | 16 | 16 | 16 | 16 | 16 | 16 | 16 | 16 | 16 | 16 | 16 | 16 | 16 |
| HARQ reference number (HRN) | 0 | 1 | 2 | 3 | 4 | 5 | 6 | 7 | | | 0 | 1 | 2 | 3 | 4 | 5 | 6 | 7 | | | 0 | 1 | 2 | 3 | 4 | 5 | 6 | 7 | | |
| Subframe bundling operation configured | | | | | X | | | | | | | | | | | | | | | | | | | | | | | | | |
| Uplink Grant configured | | X | | | | | | | X | | | | | | | | | | | | | | | | | | | | | |
| HARQ reference number with subframe bundle activated | | | | | | | | | | | 7 | 7 | 7 | 7 | 0 | 0 | 0 | 0 | 1 | 1 | 1 | 1 | 2 | 2 | 2 | 2 | 7 | | | |
| Transmission pattern (TP1) | | | | | | | | | | | 7 | 7 | 7 | 7 | 0 | 0 | 0 | 0 | 1 | 1 | 1 | 1 | 2 | 2 | 2 | 2 | | | | |
| Transmission pattern (TP2) | | | | | | | | | | | 7 | 7 | 7 | 7 | 0 | 0 | 0 | 0 | 1 | 1 | 1 | 1 | 2 | 2 | 2 | 2 | | | | |

| SFN | 0 | 0 | 0 | 0 | 0 | 0 | 0 | 0 | 0 | 0 | 1 | 1 | 1 | 1 | 1 | 1 | 1 | 1 | 1 | 1 | 2 | 2 | 2 | 2 | 2 | 2 | 2 | 2 | 2 | 2 | 3 |
|---|---|---|---|---|---|---|---|---|---|---|---|---|---|---|---|---|---|---|---|---|---|---|---|---|---|---|---|---|---|---|---|
| Subframe number (SN) | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 |
| HARQRTT | 16 | 16 | 16 | 16 | 16 | 16 | 16 | 16 | 16 | 16 | 16 | 16 | 16 | 16 | 16 | 16 | 16 | 16 | 16 | 16 | 16 | 16 | 16 | 16 | 16 | 16 | 16 | 16 | 16 | 16 | 16 |
| HARQ reference number (HRN) | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 |
| Subframe bundling operation configured |  |  | X |  |  |  |  |  |  |  |  |  |  |  |  |  |  |  |  |  |  |  |  |  |  |  |  |  |  |  |  |
| Uplink Grant configured |  |  |  |  |  |  | X |  |  |  |  |  |  |  | X |  |  |  |  |  |  |  |  |  |  |  |  |  |  |  |  |
| HARQ reference number with subframe bundle activated |  |  |  |  |  |  |  | 7 | 7 | 7 | 7 | 0 | 0 | 0 | 0 | 1 | 1 | 1 | 1 |  |  |  |  |  |  |  |  |  |  |  |  |
| Transmission |  |  |  |  |  |  |  | 7 | 7 | 7 | 7 | 0 | 0 | 0 | 0 | 1 | 1 | 1 | 1 |  |  |  |  |  |  |  |  |  |  |  |  |
| Subframe bundling operation deactivated |  |  |  |  |  |  |  |  |  |  |  |  |  |  |  |  |  |  |  |  |  | X |  |  |  |  |  |  |  |  |  |
| HARQ reference number with subframe bundle deactivated |  |  |  |  |  |  |  |  |  |  |  |  |  |  |  |  |  |  |  |  |  |  |  | 7 | 0 | 1 | 2 | 3 | 4 | 5 | 6 |

METHOD OF DISTINGUISHING HYBRID AUTOMATIC REPEAT REQUEST PROCESSES AND RELATED COMMUNICATION DEVICE

CROSS REFERENCE TO RELATED APPLICATIONS

This application claims the benefit of U.S. Provisional Application No. 61/141,247, filed on Dec. 30, 2008 and entitled "Method for Handling Data Transmission with TTI bundling in Wireless Communication System and Related Communication Device" the contents of which are incorporated herein in their entirety.

BACKGROUND OF THE INVENTION

1. Field of the Invention

A method utilized in a wireless communication and communication device thereof is disclosed, and more particularly, to a method for distinguishing hybrid automatic repeat request processes in a wireless communication system and communication device thereof.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

Architecture of the radio interface protocol of the LTE system includes three layers: the Physical Layer (L1), the Data Link Layer (L2), and the Network Layer (L3), wherein a control plane of L3 is a Radio Resource Control (RRC) layer, and L2 is further divided into a Packet Data Convergence Protocol (PDCP) layer, a Radio Link Control (RLC) layer and a Medium Access Control (MAC) layer.

In the LTE system, the main services and functions of the MAC layer include error correction through Hybrid Automatic Repeat Request (HARQ), and Transmission Time Interval (TTI) bundling transmission.

For uplink scheduling with HARQ, if the PDCCH (Physical Downlink Control Channel) indicates the UE to receive a packet, but the packet cannot be decoded successfully on an Uplink Share Channel (UL-SCH), the MAC layer of the UE performs an uplink HARQ process to request a retransmission of the packet. Since the UE would not receive any retransmission packet during a signaling round trip time (RTT) of the HARQ process, a HARQ RTT Timer is thus configured. Note that, the uplink HARQ process is associated with HARQ information consisting of a New Data Indicator (NDI), a Redundancy Version (RV) and a Transport Block (TB) size.

In addition, there is one HARQ entity at the MAC layer, which maintains a number of parallel uplink HARQ processes allowing transmissions to take place continuously while waiting for the feedback on the successful or unsuccessful reception of previous transmissions. An operation of the HARQ entity for each TTI includes identifying the HARQ process associated with the TTI, if an uplink grant has been indicated for the TTI, delivering the uplink grant including HARQ information received from the eNBs to the identified HARQ process, and finally instructing the identified HARQ process to generate a new transmission or a retransmission.

Moreover, a TTI bundling operation (or so-called subframe bundling operation) is introduced to improve LTE uplink coverage without the overhead associated with L2 segmentation and the issues with ACK (Acknowledgement)/NAK (Negative Acknowledgement) errors. The UE activating the TTI bundling is allowed to transmit the same packet in consecutive TTIs/subframes. The UE in cell boundary utilizing TTI bundling transmission can reduce transmission delay. The activation and deactivation of TTI bundling transmission is done by RRC signaling message.

If TTI bundling is configured by RRC, the parameter TTI_BUNDLE_SIZE provides the number of subframes of a subframe bundle. Within a bundle HARQ retransmissions are non-adaptive and are performed without waiting for feedbacks (e.g. NACK or ACK) from previous transmissions according to TTI_BUNDLE_SIZE. A feedback for a bundle is only received for a specific TTI corresponding to TTI_BUNDLE_SIZE. A retransmission of a TTI bundle is also a TTI bundle.

Furthermore, for transmission of an uplink message containing a C-RNTI (Cell Radio Network Temporary Identifier) MAC control element or an uplink message including a CCCH (Common Control Channel) SDU (Service Data Unit) during a random access procedure, the TTI bundling does not apply.

The prior art does not appear to specify how to identify the uplink HARQ process associated with the subframe bundling operation. Moreover, the HARQ entity maintains at most 8 parallel HARQ processes in the uplink for non-subframe bundling operation, and at most 4 HARQ processes in the uplink for subframe bundling operation. This means that the number of the HARQ processes changes when the UE activate or deactivate the subframe bundling operation. However, when a transit between the non-subframe and subframe bundling operations occurs, the UE does not know which HARQ processes are kept activated and also does not know which HARQ process corresponds to which set of HARQ information received after the transit. Applying the wrong HARQ information to a HARQ process causes data transmission errors. The UE can encounter a number of issues as described below.

Issue 1: Consider the UE has 8 HARQ processes being used for uplink transmission in the non-subframe bundling operation. Since the prior art does not clearly specify how to identify a HARQ process associated with the subframe, the UE has a difficulty in distinguishing the HARQ process associated with the subframe without any means of identifying the HARQ process, and thereby is liable to use the HARQ information received from the eNBs for the wrong HARQ process. For example, when the UE receives an uplink grant with an NDI, the UE cannot distinguish which of the 8 HARQ processes the NDI is for. Since the UE cannot determine the NDI if is toggled or not, the UE may generate a transmission for an expected retransmission or a retransmission for an expected transmission.

Issue 2: When the subframe bundling operation is configured, 4 of 8 HARQ processes are used for uplink transmission and the other 4 processes are suspended according to the prior art. However, the prior art does not appear to specify which 4 processes are used for uplink transmission. Without specification, as mentioned above, the UE cannot know if the NDI is toggled and then cannot decide to transmit a new transmission or perform an adaptive retransmission.

Take an issue 3 for example. When the subframe bundle is de-configured, the prior art does not appear to specify how to resume uplink transmission for a suspended HARQ process. Without specifying which of the 8 processes is resumed first, as in issue 1, when the UE receives an uplink grant with the NDI, the UE cannot determine which process the NDI is for. Therefore, it is not known if the first transmission of the suspended process is a new transmission or a retransmission.

In addition to the issues mentioned above, a Message 3 transmission inapplicable for the subframe bundling operation can cause transmission errors when the subframe bundling operation is in-use. The Message 3 transmission is transmission of a random access procedure and can be performed with a HARQ process. The interval between retransmissions and a new transmission of the HARQ process is 8 ms (HARQ RTT) in the non-subframe bundling operation, but 16 ms in the subframe bundling operation. During the subframe bundling operation, the Message 3 transmission of the random access procedure does not apply bundling transmission according to the prior art, but still applies 16 ms HARQ RTT of the bundling transmission to the HARQ process, which delays the random access procedure completion since the Message 3 retransmission timing in the HARQ process is doubled.

Furthermore, as mentioned above, in a subframe bundling operation, the Message 3 transmission and retransmissions do not apply bundling transmission. However, if the Message 3 transmission collides with a subframe bundle transmission, the prior art does not appear to specify how to deal with this case.

SUMMARY OF THE INVENTION

A method for distinguishing uplink hybrid automatic repeat request (HARQ) processes is disclosed in a wireless communication system and related communication device to solve the abovementioned problems.

A method of distinguishing HARQ processes is disclosed for a mobile device of a wireless communication system. The method comprises assigning a plurality of HARQ reference numbers corresponding to a plurality of uplink HARQ processes respectively, for identifying each of the plurality of uplink HARQ processes.

A method of distinguishing HARQ processes is disclosed for a mobile device of a wireless communication system. The method comprises replacing a single subframe of the subframe bundle transmission with a transmission of the Message 3 when the transmission of the Message 3 collides with the subframe bundle transmission at the subframe.

These and other objectives will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a schematic diagram of exemplary HARQ reference numbers associated to subframes according to an embodiment.

FIGS. 7 and 8 are schematic diagrams of exemplary HARQ reference numbers associated to subframes according to an embodiment.

DETAILED DESCRIPTION

Figure 1:
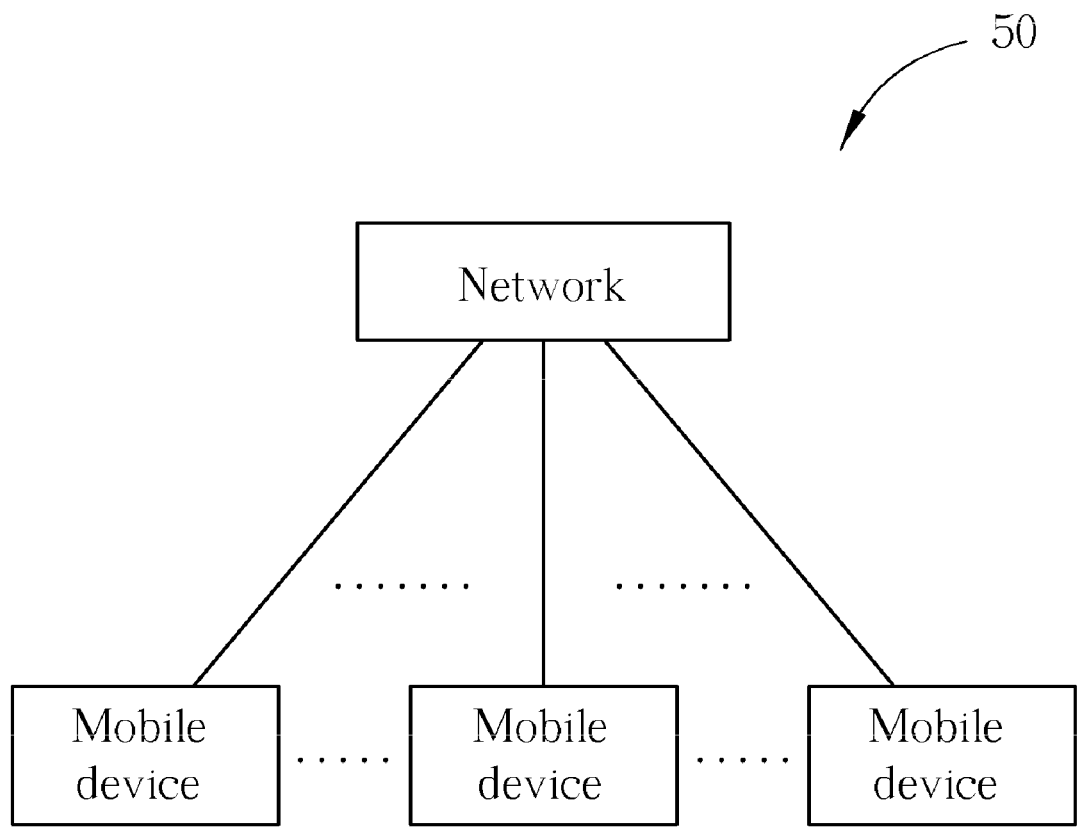
FIG. 1 is a schematic diagram of an exemplary wireless communication system.

FIG. 1 illustrates a schematic diagram of a wireless communication system 50 according to an embodiment. Briefly, the wireless communication system 50 is composed of a network and a plurality of mobile devices. The wireless communication system 50 can be a UMTS (Universal Mobile Telecommunications System) or an LTE (long-term evolution) system or any other similar network system. In the LTE system, the network is referred as a EUTRAN (evolved-UTRAN) comprising a plurality of eNBs, whereas the mobile devices are referred as user equipments (UEs). The UEs can be devices such as mobile phones, computer systems, etc. This terminology will be used throughout the application for ease of reference, and however, this should not be construed as limiting the invention to any one particular type of network. The network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
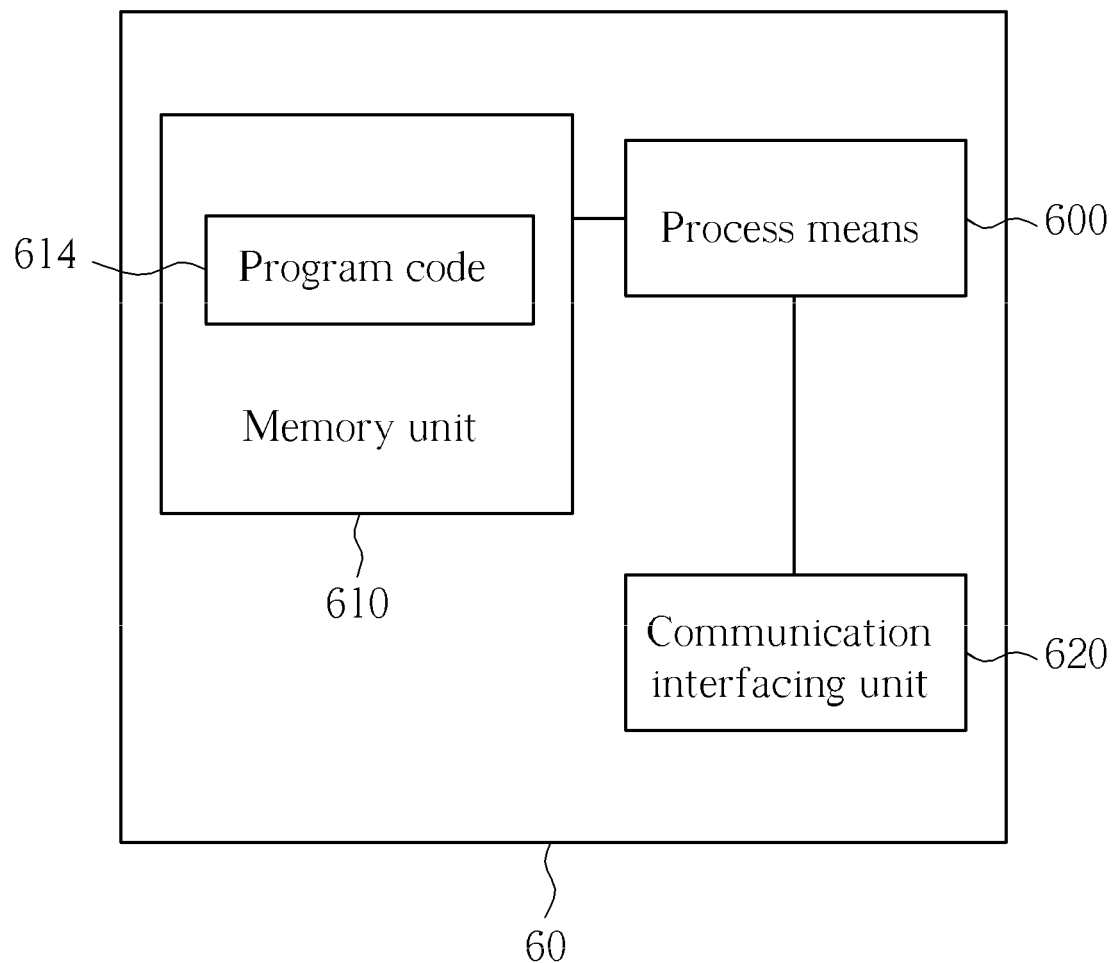
FIG. 2 is a schematic diagram of an exemplary communication device according to an embodiment.

FIG. 2 illustrates a schematic diagram of a communication device 60 according to an embodiment of the present invention. The communication device 60 can be the mobile devices shown in FIG. 1 and may include a processor means 600 such as a microprocessor or ASIC, a memory unit 610 and a communication interfacing unit 620. The memory unit 610 may be any data storage device that can store program code 614, for access by the processing means 600. Examples of the memory unit 610 include but are not limited to a subscriber identity module (SIM), read-only memory (ROM), random-access memory (RAM), CD-ROMs, magnetic tapes, hard disks, and optical data storage devices. The communication interfacing unit 620 is preferably a radio transceiver and can exchange wireless signals with the network according to processing results of the processing means 600.

Figure 3:
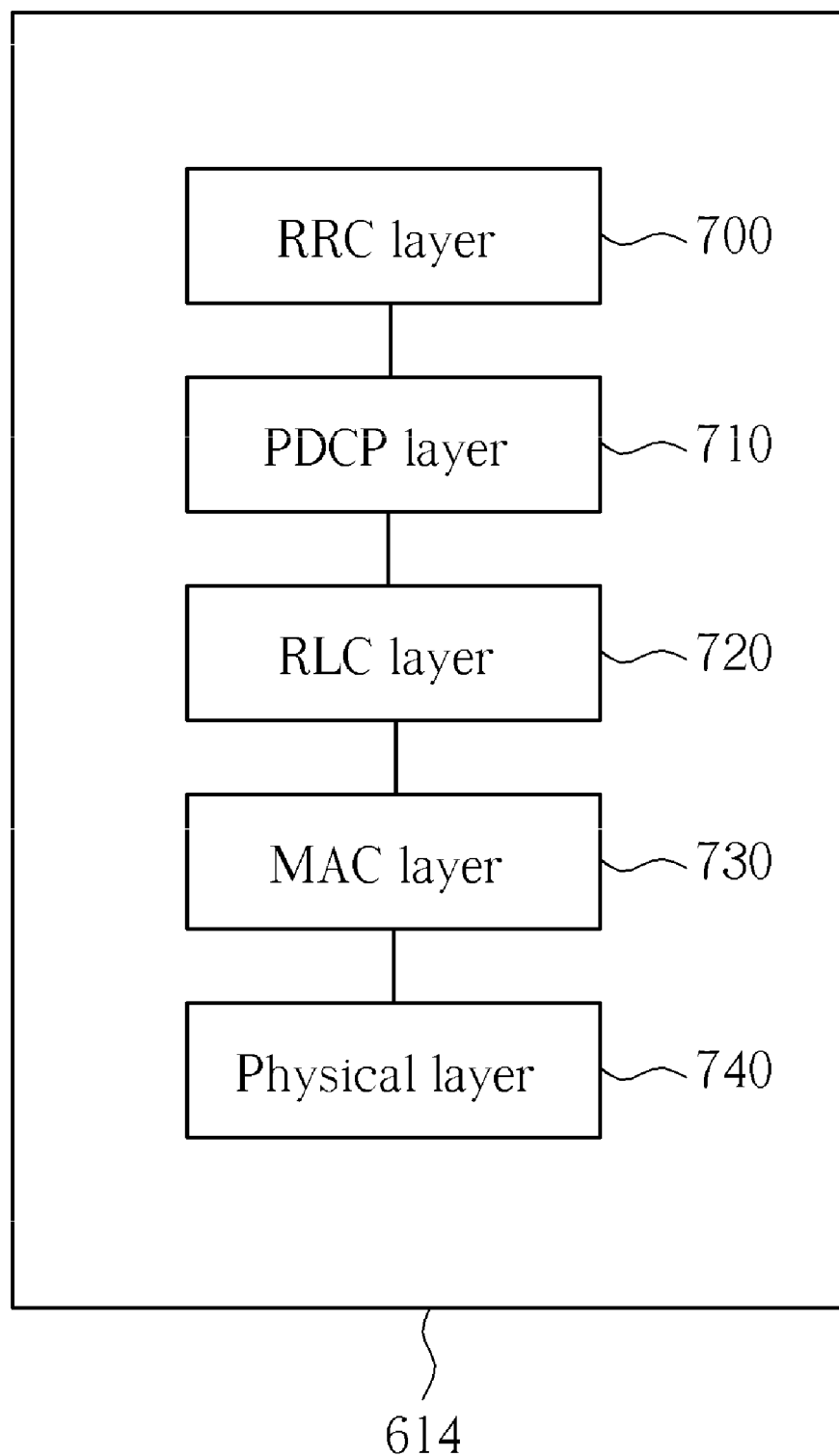
FIG. 3 is a schematic diagram of exemplary program code for the LTE system according to an embodiment.

FIG. 3 illustrates a schematic diagram of the program code 614 for the LTE system according to an embodiment. The program code 614 includes program code of multiple communications protocol layers, which from top to bottom are a radio resource control (RRC) layer 700, a packet data convergence protocol (PDCP) layer 710, a radio link control (RLC) layer 720, a medium access control (MAC) layer 730 and a physical (PHY) layer 740. In any given layer, a service data unit (SDU) is a packet received from an upper layer, and a protocol data unit (PDU) is a packet that includes a header of that layer and zero or more SDUs and is transmitted to a lower layer.

The RRC layer 710 is used for configuring an activation state of a TTI (Transmission Time Interval) bundling operation (also referred to as a subframe bundling operation) and using a TTI_BUNDLE_SIZE parameter to set a size of a TTI/subframe bundle. The MAC layer 730 is responsible for handling the TTI bundling operation, such as handling activation and deactivation of the TTI bundling operation and handling applicable targets, by itself or based on RRC configuration. In addition, the MAC layer 730 performs HARQ (Hybrid Automatic Repeat Request) processes for multiple transmissions of transport blocks and a random access procedure including transmission of a random access preamble, reception of a random access response, and transmission of a Message 3 MAC PDU. The PHY layer 740 is capable of monitoring a physical downlink control channel for receiving an uplink grant, HARQ information, etc from eNBs. With the uplink grant, the MAC layer 730 is allowed to perform data transmission of a specific HARQ process at a specific TTI based on the HARQ information. With the TTI bundling operation, the communication device 60 is able to transmit the same packet (e.g. PDU) or transport block in consecutive TTIs/subframes.

Figure 4:
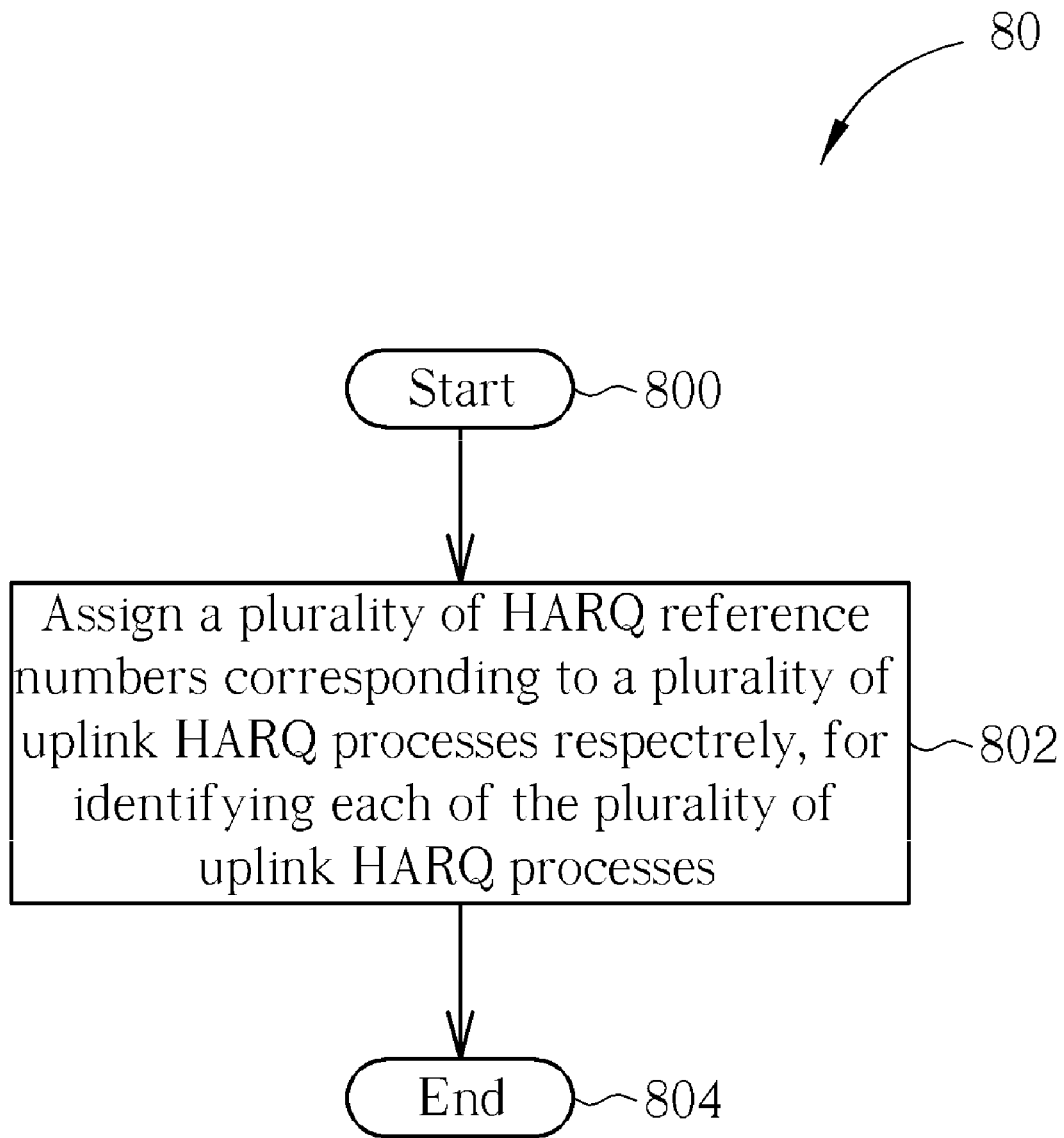
FIG. 4 is a flowchart of an exemplary process according to a first embodiment.

The flowchart of FIG. 4 illustrates a process 80 according to an embodiment. The process 80 is utilized for distinguishing a plurality of uplink HARQ processes in a non-subframe bundling operation for a UE of a wireless communication system. The process 80 can be compiled into the program code 614 and includes the following steps:

Step 800: Start.

Step 802: Assign a plurality of HARQ reference numbers corresponding to a plurality of uplink HARQ processes respectively, for identifying each of the plurality of uplink HARQ processes.

Step 804: End.

According to the process 80, each of the plurality of uplink HARQ processes is assigned a HARQ reference number for identifying each of the uplink HARQ processes. With the HARQ reference number assignment, the UE is able to distinguish which uplink HARQ process a received packet or a packet for transmission belongs to. In addition, the process 80 is applied to an eNB of the wireless communication system. That is, the eNB also assigns a HARQ reference number to HARQ information corresponding to each of the uplink HARQ processes when allocating corresponding uplink grant to the UE. Therefore, the UE can distinguish the HARQ information received from the eNB is for which HARQ process of the plurality of the HARQ processes, so as to generate an expected transmission, such as a new transmission or an adaptive/non-adaptive retransmission.

In addition, when the UE receives an uplink grant from the eNB, the UE can correctly determine a New Data Indicator (NDI) toggle state for a HARQ process according to a NDI value in the stored HARQ information and another NDI value in the received uplink grant, and thereby generate a new transmission or an adaptive retransmission for an expected transmission according to the NDI toggle state. When the NDI is toggled, which indicates the NDI value in the stored HARQ information is different with the NDI value in the uplink grant, the new transmission is generated thereof, and when the NDI is not toggled, which indicates the NDI value in the stored HARQ information is the same with the NDI value in the uplink grant, the adaptive retransmission is generated thereof.

Each HARQ reference number can be generated according to a HARQ round trip time (RTT) controlled by a HARQ RTT Timer and a subframe number of corresponding subframe by the following equation (E1):

$$m=(\text{subframe counter})\text{mod}(\text{HARQ round trip time}),$$

where m is the HARQ reference number, the subframe counter is an integer and is incremented by one every subframe with a predetermined cycle and mod is a modulus operation.

Preferably, the subframe counter is (10*SFN+subframe number+k), wherein SFN indicates a system frame number, and k is 0 or an integer. In this situation, the HARQ reference number m is obtained by the following equation (E2):

$$m=(10*\text{SFN}+\text{subframe number}+k)\text{mod}(\text{HARQ round trip time}).$$

FIG. 5 illustrates HARQ reference numbers of corresponding HARQ processes associated to subframes based on the abovementioned example. The UE operates through SFNs (System Frame Numbers) '0'-'2', and each system frame consists of subframes with subframe numbers '0'-'9'. A HARQ RTT timer is set to 8 subframes (8 milliseconds), and 8 HARQ processes are activated for uplink. According to the abovementioned equation (E2), HARQ reference numbers (HRN) of the HARQ processes associated with subframes are determined to be a cyclic sequence from 0 to 7.

By assigning the HARQ reference numbers to the HARQ processes and HARQ information, when the UE receives an uplink grant along with the HARQ information, the UE can distinguish which uplink HARQ process the HARQ information received from the eNB belongs to, and thereby avoid associating HARQ information with the wrong HARQ process. With correct HARQ information, the UE can generate the expected transmission according to the NDI toggle state.

The process 80 can be applied in a non subframe bundling operation. When the subframe bundling operation is configured, some of the HARQ processes are kept activated, and the rest are suspended. The number of activated HARQ processes is changed during a transit from the subframe to non-subframe bundling operation. In this situation, a process is provided for configuring the HARQ reference number when the transit occurs, in order to prevent errors in identifying the HARQ processes.

Figure 6:
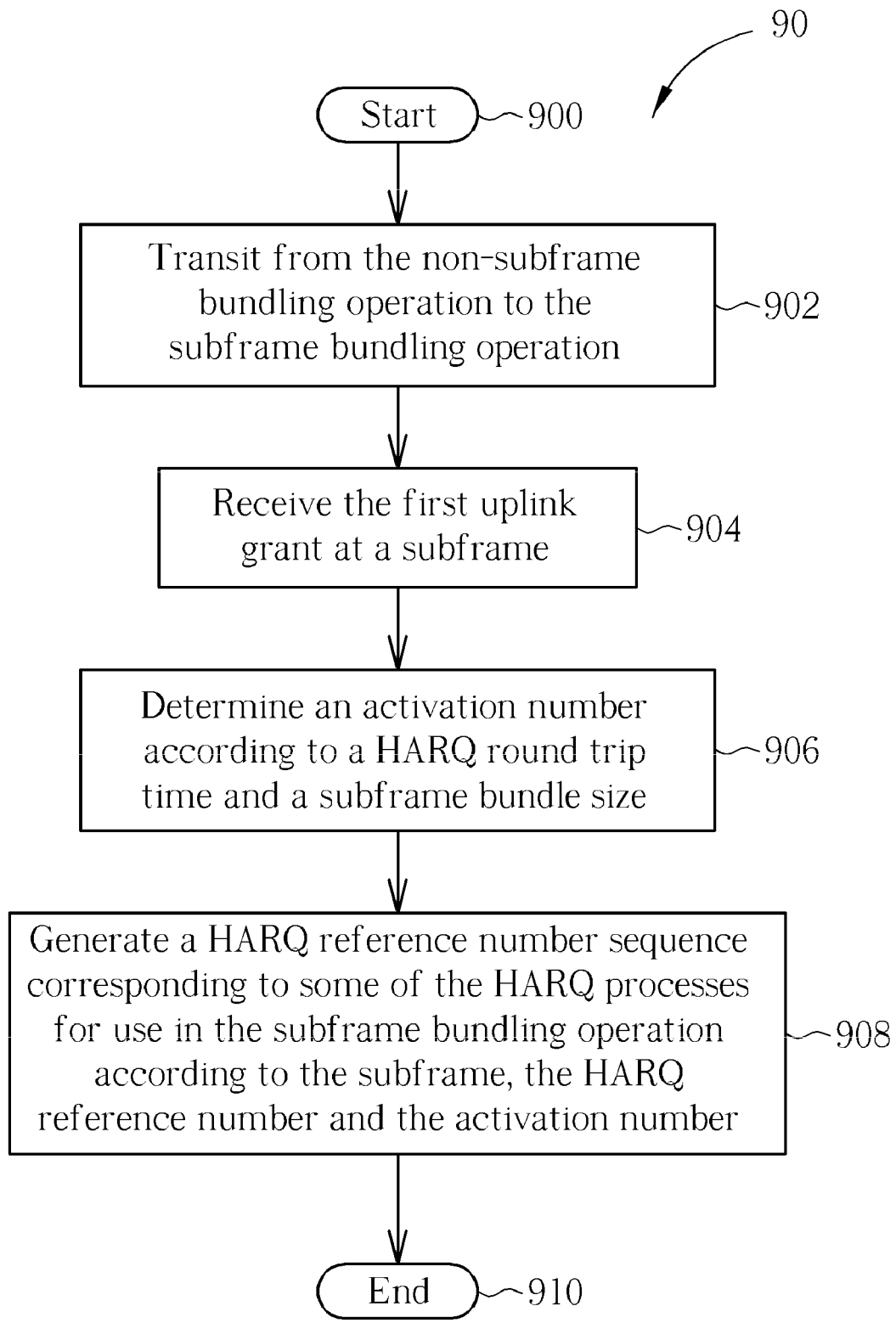
FIG. 6 is a flowchart of an exemplary process according to a second embodiment.

FIG. 6 illustrates a flowchart of a process 90 according to an embodiment. The process 90 is utilized for determining the HARQ processes which are kept activated for the subframe bundling operation for the UE of the wireless communication system. The process 90 can be compiled into the program code 614 and includes the following steps:

Step 900: Start.

Step 902: Transit from the non-subframe bundling operation to the subframe bundling operation.

Step 904: Receive the first uplink grant at a subframe.

Step 906: Determine an activation number according to a HARQ round trip time and a subframe bundle size.

Step 908: Generate a HARQ reference number sequence corresponding to some of the HARQ processes for use in the subframe bundling operation according to the subframe, the HARQ reference number and the activation number.

Step 910: End.

According to the process 90, when the UE in the non-subframe bundling operation activates the subframe bundling operation with a subframe bundle size, and receives the first uplink grant from the eNB, the UE determines the activation number (the number of uplink HARQ processes that shall be kept activated) according to a HARQ round trip time and the subframe bundle size. After that, the UE generates the HARQ reference number sequence indicating the uplink HARQ processes that shall be remained activating in the subframe bundling operation.

In addition, the uplink HARQ processes, whose HARQ reference numbers are not indicated by the HARQ reference number sequence, are de-activated when the HARQ reference number sequence is generated. Therefore, when the number of the HARQ processes changes during the transit from the non-subframe to the subframe bundling operation, this embodiment allows explicit determination of which HARQ processes are kept activated for uplink data transmission.

With reference to FIG. 7, as an example, determination of the HARQ processes used in the subframe bundling operation where a transmission shall be performed four subframes after the subframe at which the UE receives corresponding uplink grant is now described. In this example, a time length of a subframe/TTI is 1 ms (millisecond); a subframe bundle size is set to 4, and a HARQ round trip time of the subframe bundling operation is 16 ms. Therefore, the activation number is determined by 16/4=4. As can be seen in FIG. 7, three HRN cycles are revealed. When the subframe bundling operation is configured at HRN='2' of the first HRN cycle, and the UE obtains the first uplink grant at a subframe SN='3' corresponding to HRN='3' of the first HRN cycle, the UE transmits uplink data at SN='7' (four subframes after the subframe SN='3') corresponding to HRN='7' of the first HRN cycle, and thereby the first HARQ reference number HRN='7' of the HARQ reference number sequence is obtained. Since the activation number is 4, the UE keeps four successive HARQ reference number from HRNs '7' to '2'. That is, the HARQ reference number sequence is '7', '0', '1' and '2' in HRN.

After determining the HARQ reference number sequence, the UE allocates each of HARQ reference numbers of the HARQ reference number sequence {'7', '0', '1', '2'} to consecutive subframe bundles using the following formula (F1):

{(n, n, n, ... )$_{bs}$, (n+1, n+1, n+1, ... )$_{bs}$, (n+2, n+2, n+2, ... )$_{bs}$, (n+3, n+3, n+3, ... ) bs, ... }, wherein n is the first HARQ reference number of the HARQ reference number sequence, and bs is the subframe bundle size.

According to the formula (F1), the HARQ reference numbers allocated to consecutive subframes are {(7, 7, 7, 7), (0, 0, 0, 0), (1, 1, 1, 1), (2, 2, 2, 2)} in cyclic form. Therefore, the uplink HARQ processes used in the subframe bundling operation for subframe bundle transmission are performed based on the allocated HARQ reference numbers.

Also with reference to FIG. 7, for a transmission pattern TP1 of the subframe bundle transmission. Since the subframe bundle size is 4, each HARQ process shall transmit the same uplink data on four consecutive subframes. In this situation, for the first uplink grant at HRN='3' of the first HRN cycle, uplink data of the HARQ process with HRN='7' is continuously transmitted on the SN='7', '8', '9', and '0'. Furthermore, the UE receives the second uplink grant at the subframe HRN='0' of the second HRN cycle. For the second uplink grant corresponding to HRN='0' of the second cycle, uplink data of the HARQ process with HRN='0' is continuously transmitted on SN='2', '3 ', '4,' and '5' of the second HRN cycle.

In addition, another transmission pattern TP2 of the subframe bundle transmission is also depicted in FIG. 7. The first and second embodied methods differ in the transmission for the second grant. In the second embodied method, the UE only transmits the HARQ process (HRN='0') 3 times on SN='2', '3', and '4' of the second cycle since the last subframe of the bundle is allocated to the HARQ process with HRN='1'. Therefore, the HARQ process (HRN='1') still can perform transmission on a complete subframe bundle if necessary.

Please note that, within the subframe bundling operation, HARQ retransmissions are non-adaptive and are performed without waiting for feedback of previous transmissions. The feedback for a bundle is only received for the subframe corresponding to the last subframe of the bundle.

In addition to the formula (F1), another way for allocating each of the HARQ reference numbers of the HARQ reference number sequence to subframe bundles according to reception of uplink grants by the following formula (F2):

n, n+1, n+2, n+3, n, n+1, n+2, n+3, ..., wherein n is the first HARQ reference number of the HARQ reference number sequence, each element is used for a subframe bundle transmission.

FIG. 8 illustrates a second example based on the process 90. Since the HARQ reference number sequence with HRN='7', '0', '1' and '2 is determined, the first HARQ reference number n=7 is obtained. Then, the first HRN='7' is allocated to a subframe bundle corresponding to the first uplink grant. The second HRN='0' is allocated to a subframe bundle corresponding to the second uplink grant. Similarly, the third and fourth HRNs are allocated in the same way if the uplink grants are available. The HARQ reference number sequence with HRN='7', '0', '1' and '2 is allocated to related uplink grants in cyclic form.

In FIG. 8, the transmission related to an uplink grant occurs four subframes after the subframe where the uplink grant is received. As can be seen, for the first uplink grant at HRN='3' of the first cycle, data of the HARQ process with HRN='7' is continuously transmitted on the SN='7' (first cycle), '8', '9', and '0'. For the second uplink grant at HRN='0' of the second cycle, data of the HARQ process with HRN='0' is continuously transmitted on SN='2', '3', '4,' and '5' of the second cycle. For the third uplink grant at HRN='7' of the second cycle, data of the HARQ process with HRN='1' is continuously transmitted on SN='9', '0', '1,' and '2' of the second cycle. Unlike the HARQ reference number sequence allocation in FIG. 7, the HARQ reference number sequence is allocated to subframe bundles when an uplink grant is received; otherwise, the HARQ reference number sequence allocation for data transmission is not performed. Therefore, when the UE performs subframe bundle transmission according to the allocated HARQ reference number sequence, there is no transmission disability of a certain HARQ process.

According to the process 90, when the UE in the non-subframe bundling operation activates the subframe bundling operation according to an indication from the network, the UE and the network can determine the HARQ processes for continuous activation. In this situation, the UE is able to distinguish which HARQ process corresponds to the received HARQ information and thereby can apply accurate HARQ configuration to generate a new transmission, or an adaptive retransmission according to the HARQ information.

In the abovementioned embodiments, the uplink grant can be sent on a PDCCH (Physical Dedicated Control Channel) or a PHICH (Physical Hybrid Automatic Repeat Request Indicator Channel) or be a Semi-Persistent Scheduling grant. The transmission data of the HARQ processes can be sent on for a PUSCH (Physical Uplink Shared Channel) transmission.

Figure 9:
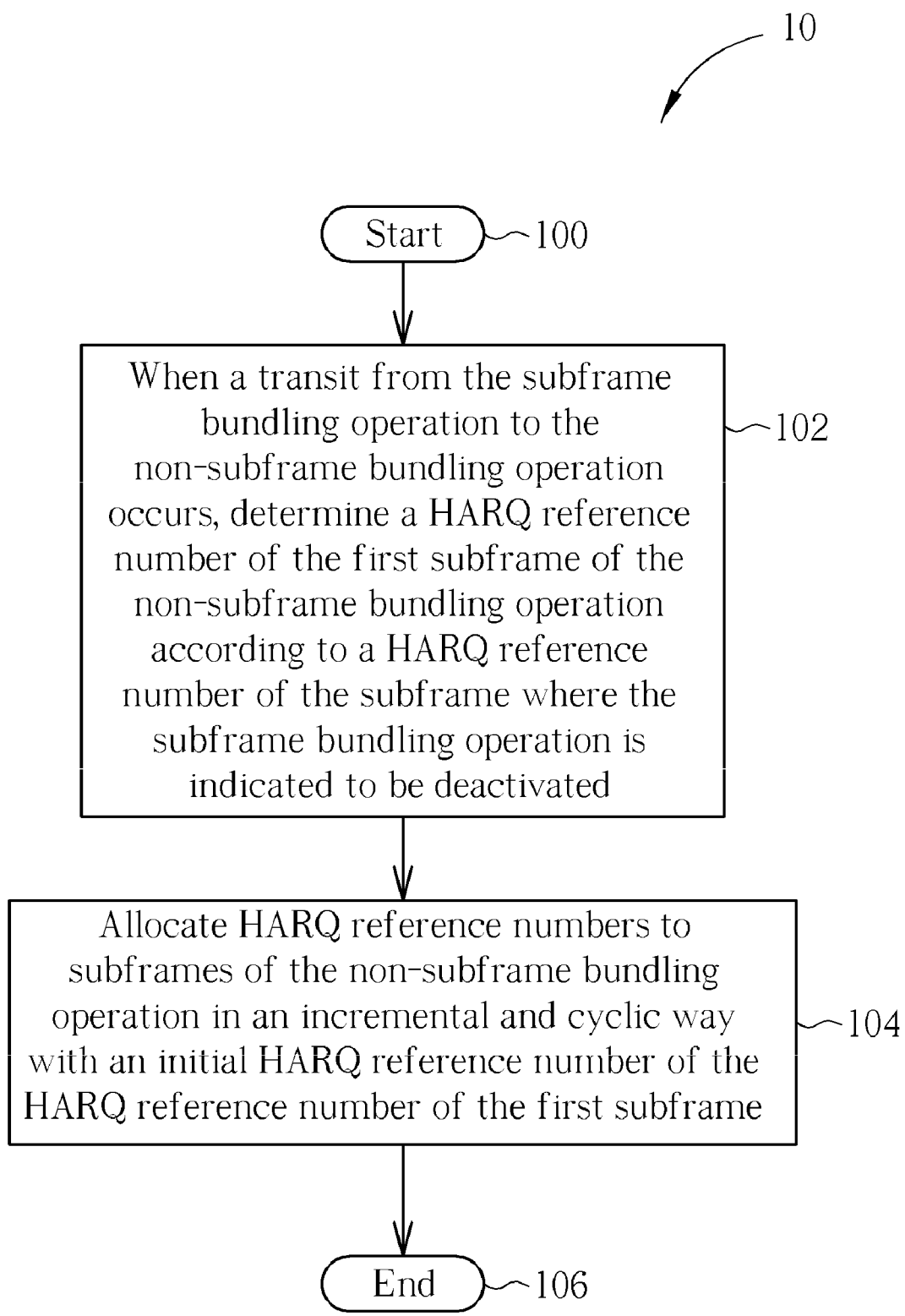
FIG. 9 is a flowchart of an exemplary process according to a third embodiment.

Moreover, the number of HARQ processes used in the non-subframe bundling operation changes during a transit from the subframe bundling operation to the non-subframe bundling operation. The UE needs to activate the suspended HARQ processes and determines the initial HARQ process of the subframe bundling operation. FIG. 9 illustrates a flowchart of a process 10 according to an embodiment. The process 10 is utilized for activating suspended HARQ processes in the subframe bundling operation. The process 10 can be compiled into the program code 614 and includes the following steps:

Step 100: Start.

Step 102: When a transit from the subframe bundling operation to the non-subframe bundling operation occurs, determine a HARQ reference number of the first subframe of the non-subframe bundling operation according to a HARQ reference number of the subframe where the subframe bundling operation is indicated to be deactivated.

Step 104: Allocate HARQ reference numbers to subframes of the non-subframe bundling operation in an incremental and cyclic way with an initial HARQ reference number of the HARQ reference number of the first subframe.

Step 106: End.

According to the process 10, when the UE in the subframe bundling operation deactivates the subframe bundling operation at a subframe, the UE determines an initial HARQ reference number according to the subframe, and then allocates the HARQ reference numbers to following subframes of the non-subframe bundling operation in an incremental and cyclic way according to the initial HARQ reference number. In FIG. 8 the UE deactivates subframe bundling operation at SN='2' (third cycle) corresponding to HRN='6', and then transmits uplink data at SN='3'. The HRN='6' is the HRN of the subframe where the subframe bundling operation is deactivated. With this, the UE allocates the HARQ reference numbers to consecutive subframes of the non-subframe bundling operation by the following formula (F3):

p+1, p+2, p+3, . . . where (p+1) is the initial HARQ reference number

That is, the UE allocates the HARQ reference numbers [7, 0, 1, 2, 3, 4, 5, 6] in incremental and cyclic way. The HARQ processes with HRNs=3, 4, 5, 6 are re-activated. Data transmission of the HARQ processes shall base on the allocated HARQ reference numbers of 7, 0, 1, 2, 3, 4, 5, 6.

As mentioned above, when UE in the subframe bundling operation deactivates the subframe bundling operation, the number of the HARQ processes for non-subframe bundling operation changes. Therefore, according to the process 10, the UE can activate the suspended HARQ processes from the subframe bundling operation, and thereby use at most 8 HARQ processes for uplink data transmission in the non-subframe bundling operation.

In addition, since the subframe bundling operation is not applied to the Message 3 of a random access procedure, Message 3 transmission possibly collides with a subframe bundle transmission during the subframe bundling operation. In this situation, the UE needs to handle the transmission priority of Message 3 and bundle transmission to avoid a transmission error or a delay of completion of the random access procedure.

Figure 10:
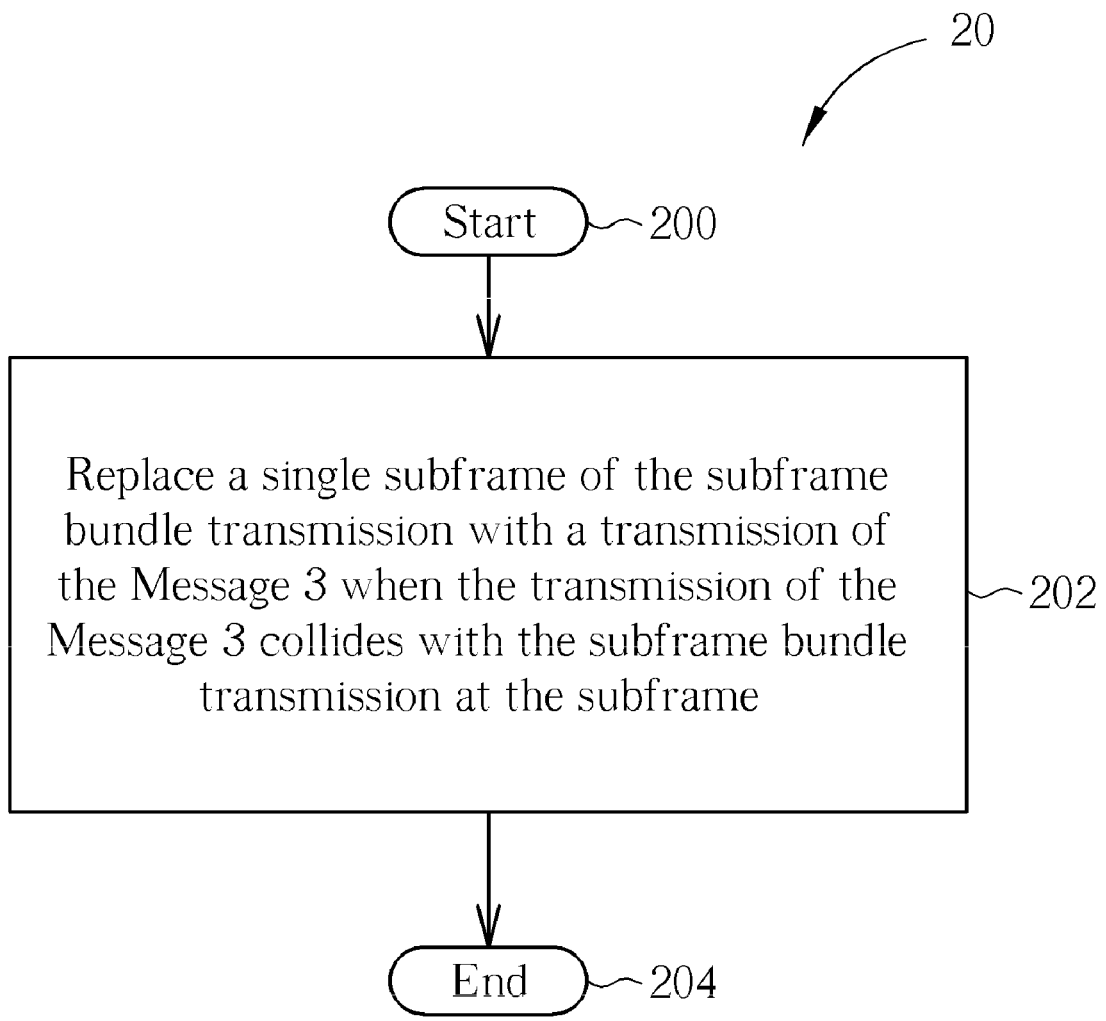
FIG. 10 illustrates a flowchart of an exemplary process according to a fourth embodiment.

FIG. 10 illustrates a flowchart of a process 20 according to a fourth embodiment. The process 20 is utilized for handling Message 3 transmission during collision. The process 20 can be compiled into the program code 614 and includes the following steps:

Step 200: Start.

Step 202: Replace a single subframe of the subframe bundle transmission with a transmission of the Message 3 when the transmission of the Message 3 collides with the subframe bundle transmission at the subframe.

Step 206: End.

According to the process 20, when the transmission of the Message 3 collides with the subframe bundle transmission, the collided subframe in the subframe bundle transmission is replaced by the Message 3 transmission. Transmission contents of the subframes which do not collide with the Message 3 are not affected by the Message 3 transmission collision.

Based on the concept of the process 20, take an example of Message 3 transmission collision under activation of uplink HARQ processes with HARQ reference number assignment as the examples related to FIG. 4. Please also refer to FIG. 8. During subframe bundling operation, the transmission follows the HARQ reference number sequence HRN='7', '0', '1' and '2. The detail for the HARQ reference number assignment can be referred from the above mentioned, so the detailed description is omitted herein. Thus, if the Message 3 collides with the third subframe of the bundle transmission (e.g. HRN='7'), in this situation, the UE transmits the subframe bundle with the first, second, and fourth subframes of the bundle transmission (e.g. HRN='7') and uses the third subframe to transmit the Message 3.

Figure 11:
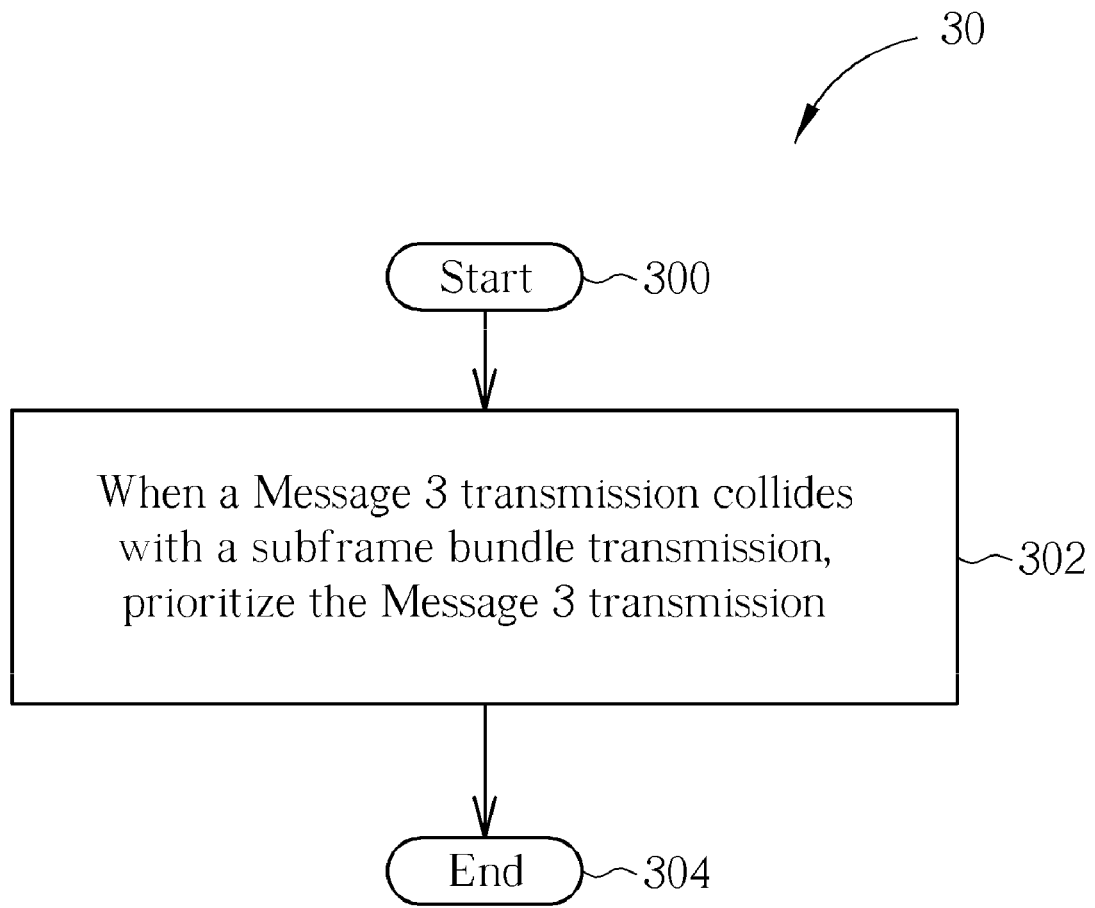
FIG. 11 illustrates a flowchart of an exemplary process according to a fifth embodiment.

Moreover, another way for handling the Message 3 transmission when the collision occurs is provided herein. FIG. 11 illustrates a flowchart of a process 30 according to a fifth embodiment. The process 30 can be compiled into the program code 614 and includes the following steps:

Step 300: Start.

Step 302: When a Message 3 transmission collides with a subframe bundle transmission, prioritize the Message 3 transmission.

Step 304: End.

According to the process 30, the Message 3 has higher priority for transmission than the bundle transmission. One way for transmitting the Message 3 is that when the Message 3 transmission collides with the subframe bundle transmission, the subframe bundle transmission is not continued. In other words, the transmission of the bundle is cancelled, and the Messages 3 are transmitted instead. Furthermore, the process 20 may also be performed following the process 30.

As mentioned above, when the UE in the subframe bundling operation performs the random access procedure, the Message 3 transmission may collide with a bundle transmission. Therefore, the process 20 and 30 can provide proper ways of transmitting Message 3 during collision.

Moreover, another way for handling the Message 3 to avoid a collision is to exclude transmission of the Message 3 of a random access procedure when a data transmission is performed according to the HARQ reference number sequence for the HARQ processes used in the subframe bundling operation. In this situation, the Message 3 transmission is applied to the non-subframe bundling operation.

In conclusion, the embodiments assign the HARQ reference numbers to the uplink HARQ processes and the HARQ information, for the UE to distinguish which HARQ process the HARQ information received from the eNB corresponds to, and to generate an expected transmission corresponded to the HARQ process.

Those skilled in the art will readily observe that numerous modifications and alterations of the device and method may be made while retaining the teachings and spirit and scope of the invention. Accordingly, the above disclosure should be construed as limited only by the metes and bounds of the appended claims.

What is claimed is:

1. A method of distinguishing hybrid automatic repeat request, hereinafter called HARQ, processes for a mobile device of a wireless communication system, the method comprising:

assigning a plurality of HARQ reference numbers corresponding to a plurality of uplink HARQ processes respectively, for identifying each of the plurality of uplink HARQ processes; and generating each of the plurality of HARQ reference numbers according to a subframe number of corresponding subframe and a HARQ round trip time.

2. The method of claim 1, wherein generating each of the plurality of HARQ reference numbers according to corresponding subframe number and the HARQ round trip time comprises:

generating each of the plurality of HARQ reference numbers associated to corresponding subframe by an equation:

$m =$ (subframe counter) mod HARQ round trip time, where m is a HARQ reference number, the subframe counter is an integer and is incremented by one every subframe with a predetermined cycle, and mod is a modulus operation.

3. The method of claim 2, wherein the subframe counter is obtained by (10* SFN +subframe number +k), where SFN indicates system frame number, and k is 0 or an integer.

4. The method of claim 1 further comprising:
receiving an uplink grant; and
determining a New Data Indicator (NDI) toggle state for each of the plurality of HARQ processes according to a first NDI value in HARQ information associated to each of the plurality of HARQ processes and a second NDI value in the received uplink grant.

5. The method of claim 1, wherein the plurality of uplink HARQ processes are capable of a subframe bundling operation and a non-subframe bundling operation.

6. The method of claim 5, wherein the plurality of uplink HARQ processes operates in the non-subframe bundling operation, and the plurality of HARQ reference numbers are cyclically allocated to a plurality of subframes.

7. The method of claim 6 further comprising generating each of the plurality of HARQ reference numbers associated to corresponding subframe by an equation:

$$m = (\text{subframe counter}) \bmod \text{HARQ round trip time},$$

where m is a HARQ reference number, the subframe counter is an integer and is incremented by one every subframe with a predetermined cycle, and mod is an module operation.

8. The method of claim 7, wherein the subframe counter is obtained by (10* SFN +subframe number +k), where SFN indicates system frame number, and k is 0 or an integer.

9. The method of claim 5 further comprising:
transiting from the non-subframe bundling operation to the subframe bundling operation;
receiving a first uplink grant at a first subframe;
determining an activation number according to a HARQ round trip time and a subframe bundle size;
generating a HARQ reference number sequence corresponding to some of the plurality of HARQ processes for use in the subframe bundling operation according to the first subframe, the HARQ reference number and the activation number.

10. The method of claim 9 further comprises:
allocating each of HARQ reference numbers of the HARQ reference number sequence to a subframe bundle, wherein the subframe bundles are consecutive.

11. The method of claim 10 further comprises:
performing HARQ transmission according to corresponding allocated HARQ reference numbers at the subframe bundles, excluding HARQ transmission of a Message 3 of a random access procedure.

12. The method of claim 10, wherein the first HARQ reference number of the HARQ reference number sequence is a HARQ reference number four subframes after the first subframe.

13. The method of claim 9 further comprising:
allocating the first HARQ reference number of the HARQ reference number sequence to a first subframe bundle corresponding to the first uplink grant;
receiving a second uplink grant next to the first uplink grant at a second subframe; and
allocating the second HARQ reference number of the HARQ reference number sequence to a second subframe bundle corresponding to the second uplink grant.

14. The method of claim 13 further comprises:
performing HARQ transmission according to corresponding allocated HARQ reference numbers at the subframe bundles, excluding HARQ transmission of a Message 3 of a random access procedure.

15. The method of claim 13, wherein the first subframe bundle is four subframes after the first subframe, and the second subframe bundle is four subframes after the second subframe.

16. The method of claim 9 further comprising excluding transmission of a Message 3 of a random access procedure when performing data transmission according to the HARQ reference number sequence for the HARQ processes used in the subframe bundling operation.

17. The method of claim 16 further comprising applying the non-subframe bundling operation to the Message 3 transmission of the random access procedure.

18. The method of claim 5 further comprising:
when a transit from the subframe bundling operation to the non-subframe bundling operation occurs, determining a HARQ reference number of the first subframe of the non-subframe bundling operation according to a HARQ reference number of the subframe where the subframe bundling operation is indicated to be deactivated; and
allocating HARQ reference numbers to subframes of the non-subframe bundling operation in an incremental and cyclic way with an initial HARQ reference number of the HARQ reference number of the first subframe.

19. The method of claim 5 further comprising setting a priority of a Message 3 transmission higher than a priority of a subframe bundle transmission.

20. The method of claim 5 further comprising replacing a subframe bundle transmission corresponding to a subframe with a transmission of the Message 3 when the transmission of the Message 3 collides with the subframe bundle transmission at the subframe.

21. A method of distinguishing hybrid automatic repeat request, hereinafter called HARQ, processes for a mobile device of a wireless communication system, the method comprising:
respectively assigning a plurality of HARQ reference numbers corresponding to a plurality of subframes, which correspond to a plurality of uplink HARQ processes under subframe bundling or non-subframe bundling operation, for identifying each of the plurality of uplink HARQ processes and the plurality of subframes;
replacing a subframe bundle transmission corresponding to a subframe with a transmission of the Message 3 according to a HARQ reference number assigned to the subframe when the transmission of the Message 3 collides with the subframe bundle transmission at the subframe.

22. The method of claim 21 further comprising applying the non-subframe bundling operation to the Message 3 transmission of the random access procedure.

* * * * *